(12) United States Patent
Hasegawa et al.

(10) Patent No.: US 7,995,868 B2
(45) Date of Patent: Aug. 9, 2011

(54) IMAGE PROCESSING METHOD AND IMAGE PROCESSING DEVICE

(75) Inventors: Hiromu Hasegawa, Osaka (JP); Yusuke Nara, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 1131 days.

(21) Appl. No.: 11/577,453

(22) PCT Filed: Oct. 4, 2005

(86) PCT No.: PCT/JP2005/018349
§ 371 (c)(1),
(2), (4) Date: Apr. 18, 2007

(87) PCT Pub. No.: WO2006/043414
PCT Pub. Date: Apr. 27, 2006

(65) Prior Publication Data
US 2007/0280539 A1 Dec. 6, 2007

(30) Foreign Application Priority Data

Oct. 19, 2004 (JP) .................................. 2004-303709

(51) Int. Cl.
*G06K 9/32* (2006.01)
(52) U.S. Cl. .......... 382/299; 382/260; 382/263; 382/264
(58) Field of Classification Search .................. 382/299, 382/260, 261, 262, 263, 264; 348/22.1, 272, 348/699
See application file for complete search history.

(56) References Cited

U.S. PATENT DOCUMENTS

| 5,319,719 | A | * | 6/1994 | Nakazawa et al. | ............ 382/132 |
| 5,459,589 | A | * | 10/1995 | Ohnishi et al. | ................ 358/518 |
| 5,917,963 | A | * | 6/1999 | Miyake | ........................ 382/300 |

(Continued)

FOREIGN PATENT DOCUMENTS

CN 1371210 A 9/2002
(Continued)

OTHER PUBLICATIONS

U.S. Appl. No. 12/269,354, filed Nov. 12, 2008, Hasegawa.

*Primary Examiner* — Wesley Tucker
*Assistant Examiner* — Aklilu K Woldemariam
(74) *Attorney, Agent, or Firm* — Oblon, Spivak, McClelland, Maier & Neustadt, L.L.P.

(57) ABSTRACT

The present invention relates to an interpolation method and a filtering method which utilize a correlation between pixel signals, and it is an object of the present invention to provide a sharp and high-quality image even if an error occurs in correlation degree judgment. To accomplish the above-mentioned object, an imaging device 10 is of a single-chip type, and includes a RGB Bayer pattern color filter 11, and an image is processed in a manner to be described below. Pixel signals outputted from the imaging device 10 are inputted through a signal processing part 20 to an image processing part 30. A correlation judgment part 31 judges a correlation between the pixel signals, and an interpolation processing part 32 performs a pixel interpolation process based on a correlation result. Thus, each pixel signal becomes a perfect signal having all R, G and B color components. Filter factors for a filter 34 are determined based on the correlation result, and a filtering process is performed on the pixel signals subjected to the pixel interpolation. The filter factors are determined so as to assist the pixel interpolation process best.

14 Claims, 7 Drawing Sheets

U.S. PATENT DOCUMENTS

| | | | |
|---|---|---|---|
| 6,091,460 A * | 7/2000 | Hatano et al. | 348/699 |
| 6,480,670 B1 * | 11/2002 | Hatano et al. | 386/109 |
| 7,099,045 B2 * | 8/2006 | Nabeshima | 358/2.1 |
| 7,502,529 B1 * | 3/2009 | Ma et al. | 382/300 |
| 7,636,493 B2 * | 12/2009 | Sakaguchi et al. | 382/274 |
| 2002/0140833 A1 | 10/2002 | Hirai | |
| 2003/0048958 A1 * | 3/2003 | Ishiguro | 382/261 |
| 2003/0169354 A1 * | 9/2003 | Aotsuka | 348/272 |
| 2004/0081366 A1 * | 4/2004 | Monobe et al. | 382/261 |
| 2005/0047673 A1 * | 3/2005 | Sakaguchi et al. | 382/261 |
| 2005/0232515 A1 * | 10/2005 | Chae | 382/300 |
| 2006/0114526 A1 | 6/2006 | Hasegawa | |
| 2007/0126885 A1 | 6/2007 | Hasegawa | |

FOREIGN PATENT DOCUMENTS

| | | |
|---|---|---|
| EP | 1 229 743 A2 | 8/2002 |
| JP | 11-205808 | 7/1999 |
| JP | 11-220745 | 8/1999 |
| JP | 2000-308073 | 11/2000 |
| JP | 2002-503894 | 2/2002 |
| JP | 2002-232904 | 8/2002 |
| JP | 2004-128564 | 4/2004 |
| JP | 2004-140495 | 5/2004 |
| JP | 2004-159176 | 6/2004 |
| JP | 2004-199233 | 7/2004 |
| JP | 2004-364201 | 12/2004 |
| JP | 2006-33045 | 2/2006 |

* cited by examiner

F I G . 1
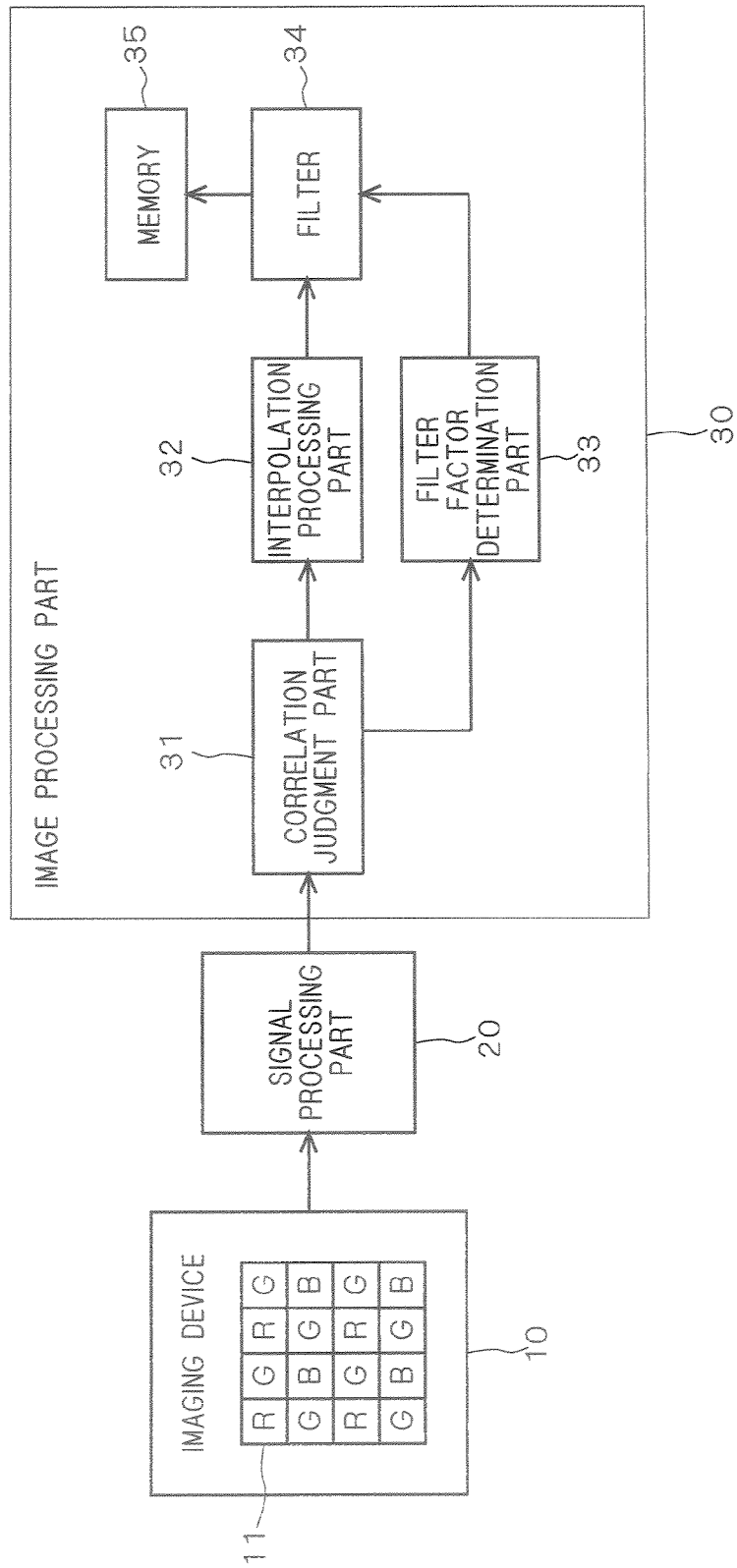

FIG. 3

VERTICAL FILTER

| 0 | 0 | 1 | 0 | 0 |
|---|---|---|---|---|
| 0 | 0 | 2 | 0 | 0 |
| 0 | 0 | 6 | 0 | 0 |
| 0 | 0 | 2 | 0 | 0 |
| 0 | 0 | 1 | 0 | 0 |

(A)

HORIZONTAL FILTER

| 0 | 0 | 0 | 0 | 0 |
|---|---|---|---|---|
| 0 | 0 | 0 | 0 | 0 |
| 1 | 2 | 6 | 2 | 1 |
| 0 | 0 | 0 | 0 | 0 |
| 0 | 0 | 0 | 0 | 0 |

(B)

DIAGONALLY RIGHTWARD FILTER

| 0 | 0 | 0 | 0 | 1 |
|---|---|---|---|---|
| 0 | 0 | 0 | 2 | 0 |
| 0 | 0 | 6 | 0 | 0 |
| 0 | 2 | 0 | 0 | 0 |
| 1 | 0 | 0 | 0 | 0 |

(C)

DIAGONALLY LEFTWARD FILTER

| 1 | 0 | 0 | 0 | 0 |
|---|---|---|---|---|
| 0 | 2 | 0 | 0 | 0 |
| 0 | 0 | 6 | 0 | 0 |
| 0 | 0 | 0 | 2 | 0 |
| 0 | 0 | 0 | 0 | 1 |

(D)

MEAN FILTER

| 0 | 0 | 0 | 0 | 0 |
|---|---|---|---|---|
| 0 | 1 | 1 | 1 | 0 |
| 0 | 1 | 1 | 1 | 0 |
| 0 | 1 | 1 | 1 | 0 |
| 0 | 0 | 0 | 0 | 0 |

(E)

| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

(F)

- ⬍ VERTICAL INTERPOLATION
- ⬌ HORIZONTAL INTERPOLATION
- ⬊ DIAGONALLY RIGHTWARD INTERPOLATION
- ⬋ DIAGONALLY LEFTWARD INTERPOLATION
- M  MEDIAN INTERPOLATION
- MEAN  MEAN INTERPOLATION

IMAGE PROCESSING METHOD AND IMAGE PROCESSING DEVICE

TECHNICAL FIELD

The present invention relates to an interpolation method and a filtering method which utilize a correlation between pixel signals, and an apparatus therefor.

BACKGROUND ART

Imaging devices such as CCD and CMOS imaging devices for use in digital cameras and the like perform a photoelectric conversion of light received through a color filter to output image data. The color filter includes an RGB color filter, a YMCK color filter and the like. A single-chip imaging device having a color filter outputs image data about one color per pixel. For example, an imaging device having the RGB color filter outputs image data about an R (red) component, a C (green) component or a B (blue) component per pixel.

Thus, image data outputted from a single-chip imaging device including the color filter is processed in such a manner that because only the image data about one color per pixel is outputted, the image data about the remaining color components is subjected to an interpolation process. Various algorithms are used for this interpolation process.

Because the interpolation process is the process of inferring image data about a target pixel from image data about its surrounding pixels, there are cases in which incorrect interpolation occurs depending on the contents of images. To solve the problem, a method has been carried out which calculates a difference signal between vertical signals of the same color and a difference signal between horizontal signals of the same color to determine the degree of correlation in the vertical direction and the horizontal direction, thereby interpolating pixels in accordance with this degree of correlation.

Patent Documents 1 and 2 to be described below disclose inventions intended for obtaining an image with reduced image blurring and reduced level variations by repeating the interpolation process of color difference signals twice.

Patent Document 1: Japanese Patent Application Laid-Open No. 2004-128564

Patent Document 2: Japanese Patent Application Laid-Open No. 2004-140495

DISCLOSURE OF INVENTION

Problems to be Solved by Invention

There are, however, cases where even the above-mentioned method causes a correlation judgment error in an edge portion and a high frequency region of a thin line and the like (particularly a region near the Nyquist frequency and a region of a thin line straddling pixels). In such cases, an image subjected to the interpolation process can be a partially blurred image because an incorrect correction process is carried out.

In view of the above-mentioned problems, it is therefore an object of the present invention to provide a sharp and high-quality image even if an error occurs in correlation degree judgment.

Means for Solving Problems

According to an aspect of the present invention, a method of processing an image comprises; a step of inputting pixel signals for respective pixels, each of said pixel signals including a signal for at least one of a plurality of color components in a predetermined color space; a correlation step of judging a correlation of each of said pixels corresponding to said pixel signals by using pixel signals within a predetermined region surrounding each pixel; a pixel interpolation step of executing a pixel interpolation process upon each of said pixels corresponding to said pixel signals, with consideration given to said correlation; and a filtering step of executing a filtering process upon each of said pixels corresponding to an pixel signal subjected to said pixel interpolation step, with consideration given to said correlation.

According to another aspect of the present invention, in said pixel interpolation step, a plurality types of pixel interpolation processes to be executed in corresponding relation to said correlation arm previously prepared. A filter for best assisting each of the plurality of types of pixel interpolation processes is previously associated with each of the plurality of types of pixel interpolation processes. Said filtering step uses one of the associated filters in accordance w h one of the plurality of types of pixel interpolation processes which is obtained in said pixel interpolation step.

According to another aspect of the present invention, said filtering step changes filter factors for setting in the filters in real time to thereby select said one of the associated filters.

According to another aspect of the present invention, a method of processing an image comprises: a correlation step of judging a correlation of each of a plurality of pixels corresponding to respect pixel signals in a predetermined color space by using pixel signals within a predetermined region surrounding each pixel; and a filtering step of executing a filtering process upon each of said pixels corresponding to said pixel signal, with consideration given to said correlation.

According to another aspect of the present invention, said filtering step executes the filtering process upon a target pixel by counting the frequency of occurrence of said correlation of each pixel within a predetermined region surrounding said target pixel, with consideration given to the correlation occurring most frequently.

According to another aspect of the present invention, said filtering step executes tie filtering process, with consideration given to the correlation, when the frequency of occurrence of the correlation occurring most frequently exceeds a predetermined threshold value.

According to another aspect of the present invention, said filtering step executes the filtering process upon a target pixel by counting the frequency of occurrence of said correlation of each pixel within a predetermined region surrounding said target pixel after weighting in accordance with a positional relationship between each pixel and said target pixel, with consideration given to the correlation occurring most frequently.

According to another as of the present invention, said filtering step executes the filtering process upon a target pixel by counting the frequency of occurrence of said correlation of each pixel within a predetermined region surrounding said target pixel only when a direction connecting said target pixel and each pixel conforms with said correlation, with consideration given to the correlation occurring most frequently.

According to another aspect of the present invention, said filtering step performs switching between first to third filtering processes for execution in accordance with situations of said correlation of each pixel within a predetermined region surrounding a target pixel, said first filtering process being executed upon said target pixel by counting the frequency of occurrence of said correlation of each pixel within the predetermined region surrounding said target pixel, with consideration given to the correlation occurring most frequently, said second filtering process being executed upon said target pixel by counting the frequency of occurrence of said correlation of each pixel within the predetermined region surrounding said target pixel after weighting in accordance with a positional relationship between each pixel and said target pixel, with consideration given to the correlation occurring most frequently, said third filtering process being executed upon said target pixel by counting the frequency of occurrence of said correlation of each pixel within the predetermined region surrounding said target pixel only when a direction connecting said target pixel and each pixel conforms with said correlation, with consideration given to the correlation occurring most frequently.

According to another aspect of the present invention, an image processing apparatus comprises: an image processing part; and an imaging device including a plurality of pixels and for outputting pixel signals for the respective pixels to said image processing part, each of said pixel signals including a signal for at least one of a plurality of color components in a predetermined color space, said image processing part including a correlation judgment part for judging, a correlation of each of said pixels corresponding to said pixel signals by using pixel signals within a predetermined region surrounding each pixel, an interpolation processing part for executing a pixel interpolation process upon each of said pixels corresponding to said pixel signals, with consideration given to said correlation, and a filtering processing part for executing a filtering process upon each of said pixels corresponding to said pixel signal outputted from said interpolation processing part, with consideration given to said correlation.

According to another aspect of the present invention, said filtering processing part includes a plurality of filters, and a filter selection part capable of selecting one of said plurality of filters, said interpolation processing part being capable of executing a plurality of types of said pixel interpolation process, said interpolation processing part executing one of said plurality of types of said pixel interpolation process in corresponding relation to said correlation, said filter selection part selecting one of said filters which best assists said one of said plurality of types of said pixel interpolation process, based on said correlation, said one filter selected by said filter selection part executing the filtering process on each of said pixels corresponding to said pixel signal outputted from said interpolation processing part.

According to another aspect of the present invention, in the image processing apparatus defined in claim 11, said filter selection part changes filter factors for said filters in real time based on said correlation to thereby select said one filter.

According to another aspect of the present invention, an image processing apparatus comprises: a correlation judgment part for judging a correlation of each of a plurality of pixels corresponding to respective pixel signals in a predetermined color space by using pixel signals within a predetermined region surrounding each pixel; and a filtering processing part for executing a filtering process upon each of said pixels corresponding to said pixel signal, with consideration given to said correlation.

According to another aspect of the present invention, said filtering processing part executes the filtering process upon a target pixel by counting the frequency of occurrence of said correlation of each pixel within a predetermined region surrounding said target pixel, with consideration given to the correlation occurring most frequently.

According to another aspect of the present invention, said filtering processing part executes the filtering process upon said target pixel, with consideration given to the correlation, when the frequency of occurrence of the correlation occurring most frequently exceeds a predetermined threshold value.

According to another aspect of the present invention, said filtering processing part executes the filtering process upon a target pixel by counting the frequency of occurrence of said correlation of each pixel within a predetermined region surrounding said target pixel after weighting in accordance with a positional relationship between each pixel and said target pixel, consideration to the correlation occurring most frequently.

According to another aspect of the present invention, said filtering processing part executes the filtering process upon a target pixel by counting the frequency of occurrence of said correlation of each pixel within a predetermined region surrounding said target pixel only when a direction connecting said target pixel and each pixel conforms with said correlation, with consideration given to the correlation occurring most frequently.

According to another aspect of the present invention, said filtering processing part performs switching between first to third filtering processes for execution in accordance with situations of said correlation of each pixel within a predetermined region surrounding a target pixel, said first filtering process being executed upon said target pixel by counting the frequency of occurrence of said correlation of each pixel within the predetermined region surrounding said target pixel, with consideration given to the correlation occurring most frequently, said second filtering process being executed upon said target pixel by counting frequency of occurrence of said correlation of each pixel within the predetermined region surrounding said target pixel after weighting in accordance with a positional relationship between each pixel and said target pixel, with consideration given to the correlation occurring most frequently, said third filtering process being executed upon said target pixel by counting the frequency of occurrence of said correlation of each pixel within the predetermined region surrounding said target pixel only when a direction connecting said target pixel and each pixel conforms with said correlation, with consideration given to the correlation occurring most frequently.

Effects of the Invention

The method according to an aspect of the present invention includes the pixel interpolation step with consideration given to the correlation between the pixels, and further includes the filtering step with consideration given to the correlation after the pixel interpolation step. Therefore, the method can provide a sharper image.

If an error occurs in correlation judgment, the method analyzes the correlation with adjacent pixels in the filtering step to select an optimum filter, thereby compensating for incorrect interpolation resulting from the correlation judgment error.

The image processing apparatus according to an aspect of the present invention executes the interpolation process on each pixel of the pixel signal, with consideration given to the correlation between the pixels, and further executes the filtering process. Therefore, the image processing apparatus can provide a sharper image.

If an error occurs in correlation judgment, the image processing apparatus analyzes the correlation of the target pixel with its adjacent pixels to select an optimum filter, thereby compensating for an incorrect interpolation resulting from the error.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a block diagram of an image pickup apparatus according to a preferred embodiment;

FIG. 3 shows an example of each filter for selection in accordance with a correlation result;

BEST MODE FOR CARRYING OUT THE INVENTION

First Preferred Embodiment

Figure 2:
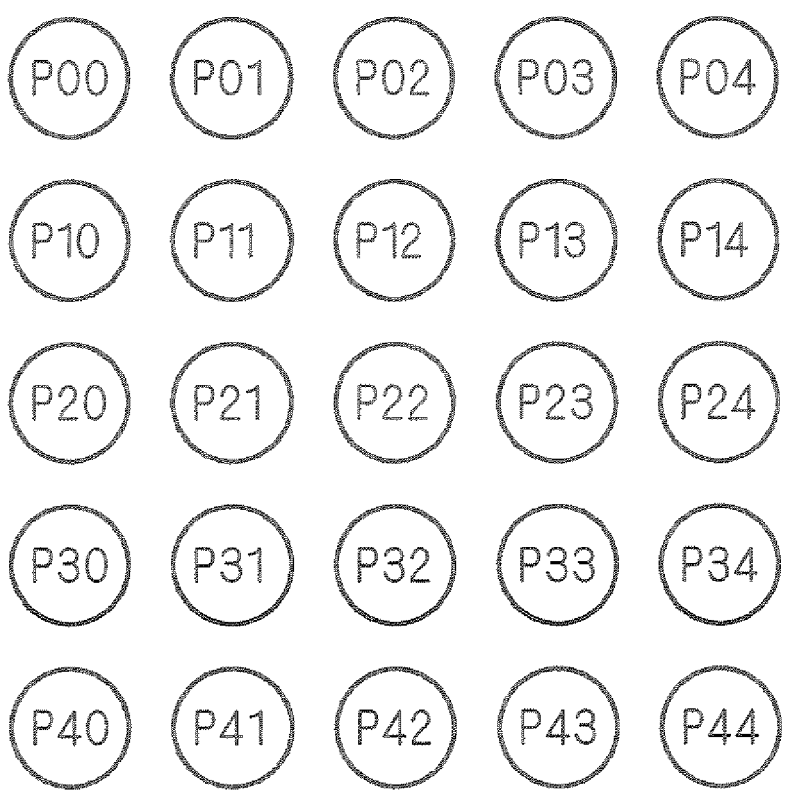
FIG. 2 is a view showing an array of pixels in a 5×5 square region with a target pixel positioned at the center.

Preferred embodiments according to the present invention will now be described with reference to the drawings. FIG. 1 is a block diagram of an image pickup apparatus 1 according to the preferred embodiments of the present invention. The image pickup apparatus 1 is applicable to, for example, a digital still camera, a digital video camera, an image scanner and the like. The image pickup apparatus 1 includes an imaging device 10, a signal processing part 20, and an image processing part 30.

Examples of the imaging device 10 are a CCD imaging device, a CMOS sensor, and the like. In this preferred embodiment, the imaging device 10 is of a single-chip type, and includes a Bayer pattern color filter 11 corresponding to an GOB color space. Thus, a pixel signal outputted from the imaging device 10 is a signal about a single color component which is R (red) G (green) or B (blue). Specifically, horizontal pixel arrays for pixel signals outputted from the imaging device 10 are as follows: a pixel array, for example, in an odd-numbered row is a pixel array which outputs R and G signals in an alternating pattern such as R, G, R, G, . . . ; and a pixel array in an even-numbered row is a pixel array which outputs G and B signals in an alternating pattern such as C, B, G, B, . . . .

The pixel signals outputted from the imaging device 10 are subjected to signal processing (pre-processing) including a white balance process, a black level correction process and the like in the signal processing part 20. The pixel signals subjected to the pre-processing in the signal processing part 20 is then transferred to the image processing part 30. In the image processing part 30, a pixel interpolation process is performed on the pixel signals inputted thereto, whereby each pixel becomes a perfect pixel signal having all R, G and B color components. In the image processing part 30, various image processing is performed on the pixel signals subjected to the pixel interpolation process.

Next, the details of the image processing according to the present invention including the pixel interpolation process will be described. The image processing part 30 includes a correlation judgment part 31, an interpolation processing part 32, a filter factor determination part 33 and a filter 34 as functional parts related to the pixel interpolation process and a filtering process, as shown in FIG. 1. The image processing part 30 further includes a memory 35 for storing the pixel signals subjected to the filter process. The functional blocks included in the signal processing part 20 and the image processing part 30 may be constructed in the form of hardware circuits or part or all of the functional blocks may be implemented by software processing.

Prior to the pixel interpolation process, a correlation judgment process is first performed in the correlation judgment part 31. The method of the correlation judgment process is not particularly limited, but a known method may be adopted for the correlation judgment process. As an example, a common method may be used which includes calculating difference signals between a target pixel and its adjacent pixels, detecting a direction in which an adjacent pixel corresponding to the minimum difference signal is disposed, and judging that the direction in which the above-mentioned adjacent pixel is disposed is a direction exhibiting the strongest correlation.

According to this preferred embodiment, the correlation judgment part 31 classifies the correlations of the target pixel into the following six types:

(R1) There is a strong correlation in a vertical direction.
(R2) There is a strong correlation in a horizontal direction.
(R3) There is a strong correlation in a diagonally rightward direction.
(R4) There is a strong correlation in a diagonally leftward direction.
(R5) There are correlations in all directions.
(R6) There is no direction exhibiting a particularly strong correlation.

The diagonally rightward direction in (R3) indicates that there is a high correlation in a direction diagonally upward to the right (or downward to the left), and the diagonally leftward direction in (R4) indicates that there is a high correlation in a direction diagonally upward to the left (or downward to the right). Whether a correlation is strong or not may be evaluated, for example, by judging whether a value evaluating the correlation exceeds a previously set threshold value or not. For example, when the difference signals are used for the judgment of the correlation, the correlation is judged to be strong in a direction in which the value of a difference signal is less than a predetermined threshold value. When the values of the difference signals are less than the threshold value in all directions, it is judged that there are correlations in all directions in (R5). When the values of the difference signals exceed the threshold value in all directions, it is judged that there is no direction exhibiting a particularly strong correlation in (R6).

The region of pixels used for the judgment of correlations is not particularly limited, but pixels in a 3×3 square region surrounding a target pixel and pixels in a 5×5 square region surrounding a target pixel may be used. For example when the 5×5 square region surrounding a target pixel is used for the judgment of correlations and the target pixel is designated by P22, the correlation judgment is made by using a square region composed of 25 pixels P00 to P44 with the target pixel P22 positioned at the center, as shown in FIG. 2. Also, a pixel interpolation method disclosed in Japanese Patent Application No. JP2004-199233 filed by the applicant of the present application may be adopted.

Then, the correlation judgment part 31 outputs information indicating the above-mentioned judgment results (R1) to (R6) to the interpolation processing part 32 and the filter factor determination part 33. The pixel signals are also outputted to the interpolation processing part 32.

Based on the pixel signals and the information indicating the correlation judgment results inputted from the correlation judgment part 31, the interpolation processing part 32 executes the pixel interpolation process denoted by (C1) to (C6) below on the pixel signals.

(C1) vertical interpolation
(C2) horizontal interpolation
(C3) diagonally rightward interpolation
(C4) diagonally leftward interpolation
(C5) mean interpolation
(C6) median interpolation (C1) denotes an interpolation method for execution when the correlation judgment result is (R1), and denotes a method of interpolating the target pixel by using its vertically adjacent pixels. (C2) denotes an interpolation method for execution when the correlation judgment result is (R2), and denotes a method of interpolating the target pixel by using its horizontally adjacent pixels. (C3) denotes an interpolation method for execution when the correlation judgment result is (R3), and denotes a method of interpolating the target pixel by using its diagonally rightwardly adjacent pixels. (C4) denotes an interpolation method for execution when the correlation judgment result is (R4), and denotes a method of interpolating the target pixel by using its diagonally leftwardly adjacent pixels. (C5) denotes an interpolation method for execution when the correlation judgment result is (R5), and denotes a method of interpolating the target pixel by using the mean value of its adjacent pixels. (C6) denotes an interpolation method for execution when the correlation judgment result is (R6), and denotes a method of interpolating the target pixel by using the median value of its adjacent pixels.

In this manner, the pixel interpolation process which is one of the vertical interpolation, the horizontal interpolation the diagonally rightward interpolation, the diagonally leftward interpolation, the mean interpolation and the median interpolation is executed in accordance with the correlation judgment result in the interpolation processing part 32. The relationship between the correlation judgment results (R1) to (R6) and the interpolation processing types (C1) to (C6) described above is an example. The relationship between the correlation judgment results and the interpolation processing types may be established as appropriate.

After the pixel interpolation process is completed in the interpolation processing part 32, the pixel signals subjected to the pixel interpolation process are outputted to the filter 34.

In the filter factor determination part 33, on the other hand, filter factors are determined which determine the processing details of the filter 34 based on the information indicating the correlation judgment result inputted from the correlation judgment part 31. After the filter factors are determined, the filter factor determination part 33 sets the filter factors in the filter 34. Specifically, the filter 34 according to this preferred embodiment includes a single filter circuit, and is adapted to change the filter factors in real time, thereby switching between a plurality of filters for operation.

FIG. 3 shows patterns of the filter 34 characterized based on the filter factors determined in the filter factor determination part 33. In FIG. 3, executing the filter process on the target pixel P22 by using a 5×5 square region composed of the 25 pixels P00 to P44 similar to that shown in FIG. 2 is taken as an example. It should be noted that the filter patterns shown in FIG. 3 are an example.

When the correlation judgment result is (R1), the filter factor determination part 33 determines the filter factors so that the filter 34 operates as a vertical filter shown in pattern (A) in FIG. 3. When the correlation judgment result is (R2), the filter factor determination part 33 determines the filter factors so that the filter 34 operates as a horizontal filter shown in pattern (B) in FIG. 3. When the correlation judgment result is (R3), the filter factor determination part 33 determines the filter factors so that the filter 34 operates as a diagonally rightward filter shown in pattern C in FIG. 3. When the correlation judgment result is (R4), the filter factor determination part 33 determines the filter factors so that the filter 34 operates as a diagonally leftward filter shown in pattern (D) in FIG. 3. When the correlation judgment result is (R5), the filter factor determination part 33 determines the filter factors so that the filter 34 operates as a mean filter shown in pattern (E) in FIG. 3. When the correlation judgment result is (R6), the filter factor determination part 33 determines the filter factors so that the filter 34 operates as a filter shown in pattern (F) in FIG. 3.

The factors for the filters shown in FIG. 3 are factors assigned to the respective adjacent pixels. In the cases of the filters shown in FIGS. 3(A) to 3(D), an output signal from the target pixel is obtained by adding together the products of the pixel values of the respective pixels and the factors corresponding to the respective pixels and then dividing the sum by 12.

That is, when the vertical filter shown in pattern (A) in FIG. 3 is used, a signal Q22 subjected to the filter process of the target pixel P22 is expressed by $$Q22 = \frac{P02 + 2 \times P12 + 6 \times P22 + 2 \times P32 = P42}{12} \quad (1)$$

When the horizontal filter shown in pattern (B) in FIG. 3 is used, the signal Q22 subjected to the filter process of the target pixel P22 is expressed by $$Q22 = \frac{P20 + 2 \times P21 + 6 \times P22 + 2 \times P23 = P24}{12} \quad (2)$$

When the diagonally rightward shown in pattern (C) in FIG. 3 is used, the signal Q22 subjected to the filter process of the target pixel P22 is expressed by $$Q22 = \frac{P04 + 2 \times P13 + 6 \times P22 + 2 \times P31 + P40}{12} \quad (3)$$

When the diagonally leftward filter shown in pattern (D) in FIG. 3 is used, the signal Q22 subjected to the filter process of the target pixel P22 is expressed by $$Q22 = \frac{P00 + 2 \times P11 + 6 \times P22 + 2 \times P33 + P44}{12} \quad (4)$$

In the case of the filter shown in pattern (E) in FIG. 3, an output signal from the target pixel is obtained by adding together the products of the pixel values of the respective pixels and the factors corresponding to the respective pixels and then dividing the sum by 9. That is, when the mean filter shown in pattern (E) in FIG. 3 is used, the signal Q22 subjected to the filter process of the target pixel P22 is expressed by $$Q22 = \frac{P11 + P12 + P13 + P21 + P22 + P23 + P31 + P32 + P33}{9} \quad (5)$$

When the filter shown in pattern (F) in FIG. 3 is used, the signal Q22 subjected to the filter process of the target pixel P22 is expressed by $$Q22 = P22 \quad (6)$$

In Equations (1) to (6), the characters P00 to P44 indicating the pixels shown in FIG. 2 shall also indicate the pixel signal values.

In this preferred embodiment, when the correlation judgment result is (R6) or the median interpolation process is executed as the pixel interpolation process, the filter 34 does not change the pixel signals as indicated in pattern (F) in FIG. 3 or in Equation (6). This is intended for the increase in processing speed because there is a low probability that acting the median filter again causes large changes in the pixel signals after the filter output. However, the filter 34 may be operated as the median filter when the correlation judgment result is (R6).

In the filtering step as described above, the plurality of filters characterized by setting the filter factors are previously prepared, and a filter which best assists the pixel interpolation method used in the pixel interpolation step is selected from among the prepared filters. Specifically, when the vertical interpolation is performed, the filter process is performed by further using the vertically adjacent pixels to assist the vertical interpolation. Similarly, when the horizontal, diagonally rightward or diagonally leftward interpolation is performed, the filter process is performed by further using the horizontally, diagonally rightwardly or diagonally leftwardly adjacent pixels to assist the horizontal, diagonally rightward or diagonally leftward interpolation. When the mean interpolation is performed, the mean filter is further applied to assist the mean process. In this preferred embodiment, when the median interpolation is performed, the median filter is not executed again for the aforementioned reason, but the median filter may be further applied to assist the median process.

How to determine the filter which best assists the pixel interpolation method or the filter with consideration given to the correlation may be determined by a dynamic method using a suitable algorithm. However, because there are not so many correlation types, the correlations and the pixel interpolation process types corresponding thereto, or the pixel interpolation process types and the filter types which best assists the same are previously optimally selected by experience and the like and associated with each other.

Each of the pixel signals subjected to the interpolation process includes signals for the respective R, G and B color components. Thus, the aforementioned filtering process may be applied to the signals for all of the color components or to a signal for at least one of the color components.

The filter factor determination part 33 may obtain the correlation judgment results (R1) to (R6) from the correlation judgment part 31 through the interpolation processing part 32. In this case, the results of the interpolation processes (C1) to (C6) executed in the interpolation processing part 32 in corresponding relation to the correlation judgment results (R1) to (R6) are provided to the filter factor determination part 33. The filter factor determination part 33 determines a filter, based on the results of the interpolation processes (C1) to (C6). The configuration of the filter factor determination part 33 will be described below (with reference to FIGS. 4 to 8).

Figures 4, 5:
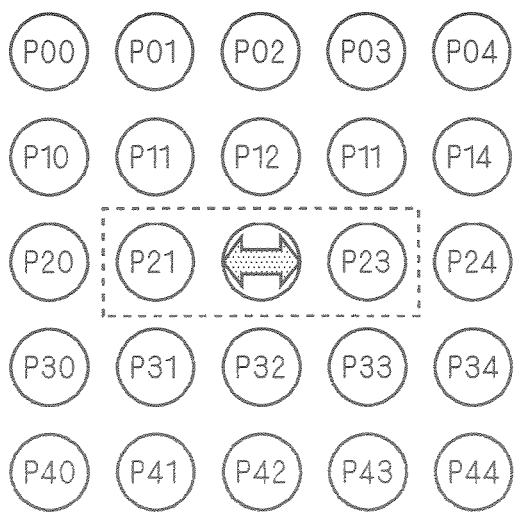
FIG. 4 shows symbols for an interpolation processing method.
FIG. 5 shows an example of a first filter selection method.

FIG. 4 shows symbols for use in FIGS. 5 to 8 which will be described below. As mentioned above, the six judgment results (R1) to (R6) are provided in the correlation judgment process, and the six interpolation processes (C1) to (C6) are executed in accordance with the judgment results. FIG. 4 shows the symbols corresponding to the six interpolation processes (C1) to (C6), respectively.

As shown in FIG. 5 for example, the target pixel P22 is shown as subjected to the horizontal interpolation (C2) by using the left and right adjacent pixels P21 and P23. Thus, the horizontal filter (pattern (B) in FIG. 3) is applied to the target pixel P22 in the filtering step. The provision of such a filtering step provides a more enhanced, distinct image.

In this manner, the filter selection method (the method described hereinabove is referred to as a first selection method) in the filter process step is a method of applying a filter which assists the interpolation process performed in the interpolation process step to the target pixel, with attention directed to the target pixel. Next, second to fourth filter selection methods will be described.

A second filter selection method will be described. The second method is a method of counting the interpolation processes executed in the interpolation process step upon a plurality of pixels in a surrounding region of the target pixel to apply a filter which assists the interpolation process having occurred most frequently.

Figure 6:
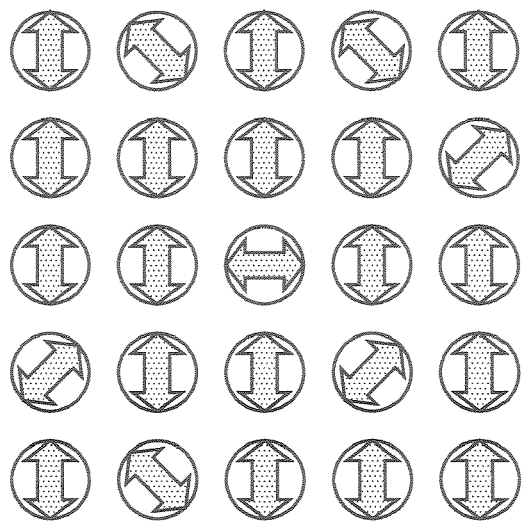
FIG. 6 shows an example of a second filter selection method.

In a 5×5 square region in the instance shown in FIG. 6, the vertical interpolation is executed on 18 pixels, the horizontal interpolation is executed on one pixel, the diagonally rightward interpolation is executed on three pixels, and the diagonally leftward interpolation is executed on three pixels. In this case, because the number of pixels subjected to the vertical interpolation is the highest, the vertical filer is adopted for the target pixel P22 in the filtering step. In this manner, the use of the second selection method allows the correction of an incorrect pixel interpolation process if there is a correlation judgment error at the target pixel.

Although the filter which assists the interpolation process having occurred most frequently is adopted in the above instance, a suitable threshold value may be established, so that the filter which assists the interpolation process having occurred most frequently is adopted only when the frequency of occurrence thereof exceeds the threshold value. As an example, the filter which assists the interpolation process having occurred most frequently may be adopted only when the frequency of occurrence thereof is equal to or greater than 13. If the frequency of occurrence of the interpolation process having occurred most frequently does not exceed the threshold value, a method of adopting the first selection method described above or a third or fourth selection method to be described later may be contemplated.

The second selection method is an effective method when the interpolation process which exceeds the threshold value is present within the surrounding region of the target pixel as described above. However, the third method to be described next is effective when there are a large number of variations in the pixel interpolation processes of the adjacent pixels.

The third filter selection method will be described. The third method is a method of counting the interpolation processes executed in the interpolation process step upon a plurality of pixels in the surrounding region of the target pixel after weighting in accordance with the positional relationship with the target pixel, to apply a filter which assists the interpolation process having occurred most frequently.

Figure 7:
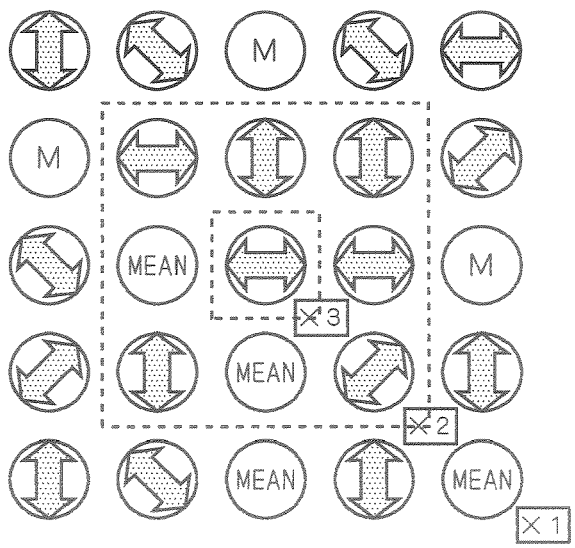
FIG. 7 shows an example of a third filter selection method.

In a 5×5 square region in the instance shown in FIG. 7, the weighting factor of the target pixel is set at 3, the weighting factor of the eight surrounding pixels immediately adjacent to the target pixel is set at 2, and the weighting factor of the 16 outer pixels is set at 1. The frequency of occurrence with consideration given to the weighting factors is counted to provide the following results: 10 (2×3 pixels+1×4 pixels) for the pixels subjected to the vertical interpolation; 8 (3×1 pixel+2×2 pixels+1×1 pixel) for the pixels subjected to the horizontal interpolation, 4 (2×1 pixel+1×2 pixels) for the pixels subjected to the diagonally rightward interpolation; 4 (1×4 pixels) for the pixels subjected to the diagonally leftward interpolation; (1×3 pixels) for the pixels subjected to the median interpolation; and 6 (2×2 pixels+1×2 pixels) for the pixels subjected to the mean interpolation. In this case, because the pixels subjected to the vertical interpolation have the highest weighted frequency of occurrence, the vertical filer is adopted for the target pixel P22 in the filtering step. In this manner, the use of the third selection method allows the correction of an incorrect pixel interpolation process if there is a correlation judgment error at the target pixel.

Figure 8:
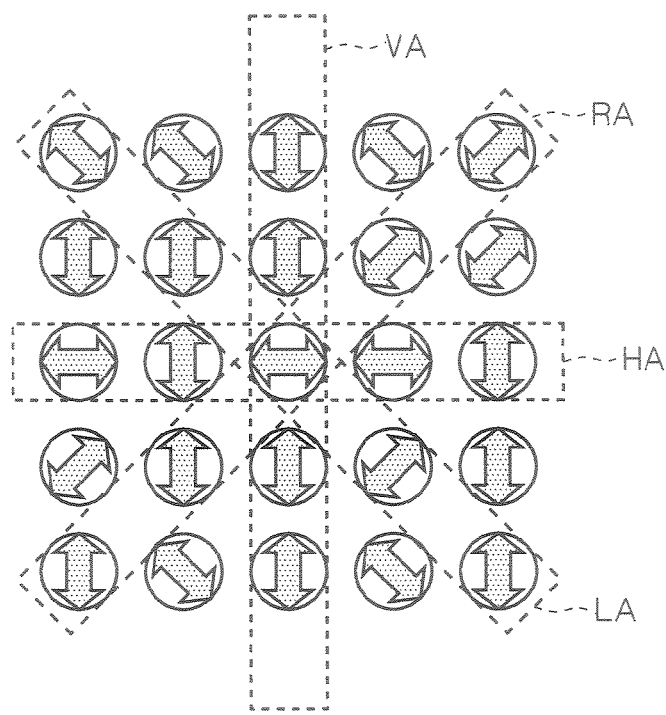
FIG. 8 shows an example of a fourth filter selection method.

The fourth filter selection method will be described. The fourth method is a method such that, based on whether a direction connecting the target pixel and each of the plurality of pixels in the surrounding region of the target pixel conforms with the interpolation process executed upon each pixel in the interpolation process step or not, the frequency of occurrence of the conformity is counted. When, for example, pixels in a 5×5 square region are used as shown in FIG. 8, a region composed of five pixels arranged in a vertical direction is defined as a vertical region VA, a region composed of five pixels arranged in a horizontal direction is defined as a horizontal region HA, a region composed of five pixels arranged in a diagonally rightward direction is defined as a diagonally rightward region RA, and a region composed of five pixels arranged in a diagonally leftward direction is defined as a diagonally leftward region LA. In each of the regions VA, HA, RA and LA, the number of occurrences of the conformity between the direction in which each region extends and the interpolation direction of pixels belonging to each region is counted.

in the instance shown in FIG. 8, the number of occurrences of the conformity between the direction in which each region extends and the interpolation direction of the pixels belonging to each region is counted to provide the following results: four pixels for the vertical region VA (that is, there are four pixels which is within the vertical region VA and which is subjected to the vertical interpolation); three pixels for the horizontal region HA; two pixels for the diagonally rightward region; and one pixel for the diagonally leftward region. In this case, because the vertical region VA includes the highest number of pixels which exhibit the conformity, the vertical filer is adopted for the target pixel P22 in the filtering step.

Alternatively, the elements of the third method may be added to the fourth method so that the counting is done after the weights are assigned to the pixels in each of the regions VA, HA, RA and LA in accordance with the positional relationship with the target pixel.

The second to fourth methods described hereinabove have respective characteristics and it is desirable that an optimum method is selected from among the second to fourth methods in accordance with the situations of the adjacent pixels. Thus, the filter factor determination part 33 preferably can execute an optimum filter process by switching between the second to fourth filter selection methods in accordance with the pixel situations in the surrounding region of the target pixel.

Second Preferred Embodiment

Next, a second preferred embodiment according to the present invention will be described. In the first preferred embodiment described above, the interpolation process and the filtering process are executed based on the correlation result after the correlation judgment. That is, the filtering process is executed for the purpose of assisting the interpolation process executed based on the correlation judgment result.

Figure 9:
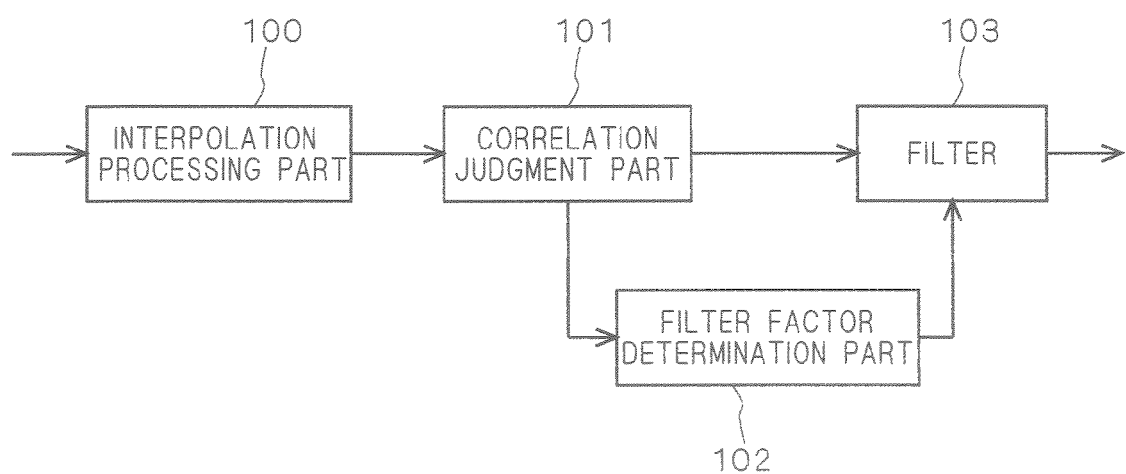
FIG. 9 is a diagram showing an image processing apparatus according to a second preferred embodiment.

According to the second preferred embodiment, on the other hand, the filter process is not executed for the purpose of assisting the interpolation process, but is executed independently based on the correlation judgment result. FIG. 9 is a block diagram showing the image processing part according to the second preferred embodiment.

The image processing part includes an interpolation processing part 100, a correlation judgment part 101, a filter factor determination part 102, and a filter 103. The pixel interpolation process is performed in the interpolation processing part 100 whereby each pixel becomes a perfect pixel signal having the signals for the respective X, G and B color components.

Next, the correlation judgment of each pixel is made in the correlation judgment part 101. The correlation judgment process is similar to the process in the first preferred embodiment. However, because each pixel has the signals for the respective R, G and B color components, a signal for one of the color components is used for the color component for use in the correlation judgment process. Alternatively, the correlation judgment of the signals for the plurality of color components may be made for comprehensive judgment.

Then, the filter factor determination part 102 determines a filter to be applied, based on information indicating the correlation result inputted from the correlation judgment part 101, and determines the filter factors. That is, the filter factor determination part 102 determines the filter to be applied in consideration for the correlations. After the filter factors are determined, the determined filter factors are set in the filter 103. In this manner, the filter process is executed based on the correlation result.

As described above, the second preferred embodiment improves the definition of an image in the filter process because the filtering process is executed based on the correlation result.

Third Preferred Embodiment

Figure 10:
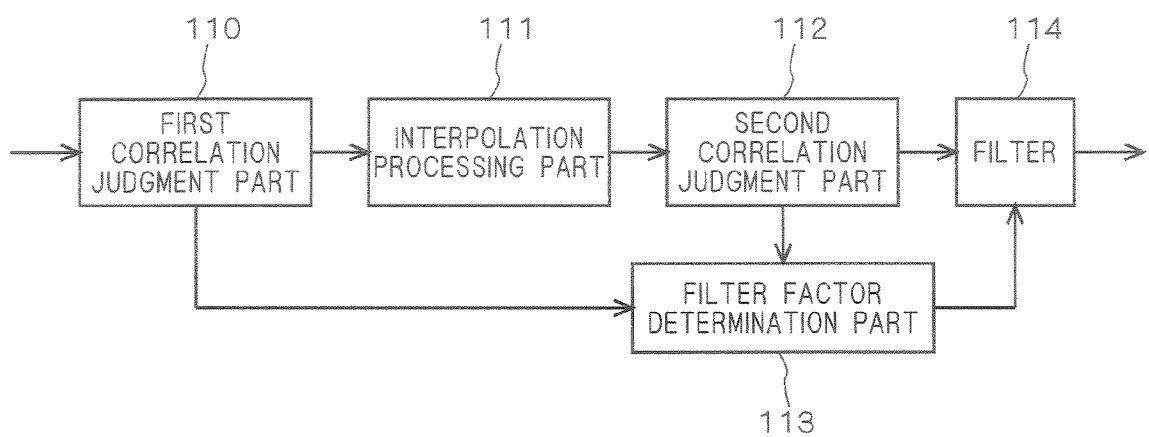
FIG. 10 is a diagram showing an image processing apparatus according to a third preferred embodiment.

Next, a third preferred embodiment according to the present invention will be described. According to the third preferred embodiment, the filter process is executed based on the results of the correlation judgments made before and after the interpolation process. FIG. 10 is a block diagram showing the image processing part according to the third preferred embodiment.

The image processing part includes a first correlation judgment part 110, an interpolation processing part 111, a second correlation judgment part 112, a filter factor determination part 113, and a filter 114.

The correlation judgment of each pixel is made in the first correlation judgment part 110. The correlation judgment process is similar to the process in the first preferred embodiment. The pixel interpolation process is performed in the interpolation processing part 111, based on the correlation judgment result from the first correlation judgment part 110. The interpolation process is similar to the process in the first preferred embodiment. The pixel interpolation process is performed in the interpolation processing part 111, whereby each pixel becomes a perfect pixel signal having the signals for the respective R, G and B color components.

Next, the correlation judgment of each pixel is made in the second correlation judgment part 112. The correlation judgment process is similar to the process in the first preferred embodiment. However because each pixel has the signals for the respective R, G and B color components, a signal for one of the color components is used for the color component for use in the correlation process. Alternatively, the correlation judgment of the signals for the plurality of color components may be made for comprehensive judgment.

Then, the filter factor determination part 113 determines a filter to be applied, based on information indicating the correlation results inputted from the first correlation judgment part 110 and the second correlation judgment part 112, and determines the filter factors. The filter factor determination part 113 makes the comprehensive judgment of the correlation results inputted from the first correlation judgment part 110 and the second correlation judgment part 112. For example, weights are assigned to the correlation judgment results so that a comprehensive judgment result is obtained. After the filter factors are determined, the filter factors are set in the filter 114. In this manner, the filter process is executed based on the correlation results.

As described above, the third preferred embodiment can prevent more correlation judgment error and improve the definition of an image in the filter process because the filtering process is executed based on the correlation results judged before and after the interpolation process.

The instance where the pixel signals are data based on the RGB color space is described in the above-mentioned preferred embodiments, but is merely an example. The present invention is, of course, applicable to the instance where the pixel signals are data based on other color spaces.

While the invention has been shown and described in detail, the foregoing description is in all aspects illustrative and not restrictive. It is therefore understood that numerous modifications and variations can be devised without departing from the scope of the invention.

The invention claimed is:

1. A method of processing an image, comprising:
   a step of inputting pixel signals for respective pixels, each of said pixel signals including a signal for at least one of a plurality of color components in a predetermined color space;
   a correlation step of judging a correlation of each of said pixels corresponding to said pixel signals by using pixel signals within a predetermined region surrounding each pixel, to determine a vertical correlation, a horizontal correlation, and a diagonal correlation;
   a pixel interpolation step of executing a pixel interpolation process upon each of said pixels corresponding to said pixel signals, the pixel interpolation process performing interpolation of the pixels in a direction that corresponds to a correlation direction determined by the correlation step; and
   a filtering step of executing a filtering process upon each of said pixels corresponding to an pixel signal subjected to said pixel interpolation step, to filter each of the pixels in a vertical direction, a horizontal direction, and a diagonal direction, respectively, by counting which interpolation direction the predetermined region was subjected to most frequently by said pixel interpolation step, and by using said most frequent interpolation direction as the filtering direction.

2. The method according to claim 1, wherein
   said filtering step changes filter factors for setting in the filters in real time to thereby select said one of the associated filters.

3. A method of processing an image, comprising:
   a correlation step of judging a correlation of each of a plurality of pixels corresponding to respective pixel signals in a predetermined color space by using pixel signals within a predetermined region surrounding each pixel and determining a correlation of each pixel with the surrounding region in a vertical direction, a horizontal direction, a diagonally rightward direction, and a diagonally leftward direction; and
   a filtering step of executing a filtering process upon each of said pixels corresponding to said pixel signal, for filtering a target pixel within the predetermined region in a vertical direction, a horizontal direction, and a diagonally rightward direction, and a diagonally leftward direction, respectively, by counting which correlation direction was found most frequently in the predetermined region by said correlation step, and by using said most frequent correlation direction as the filtering direction.

4. The method according to claim 3, wherein
   said filtering step executes the filtering process when a number of occurrence of the correlation direction that occurs most frequently exceeds a predetermined threshold value.

5. The method according to claim 3, wherein
   said filtering step executes the filtering process upon the target pixel by counting the frequency of occurrence of said correlation of each pixel within the predetermined region surrounding said target pixel after weighting in accordance with a positional relationship between each pixel and said target pixel.

6. The method according to claim 3, wherein
   said filtering step executes the filtering process upon the target pixel by counting the frequency of occurrence of said correlation of each pixel within the predetermined region surrounding said target pixel only when a direction connecting said target pixel and each pixel conforms with said correlation.

7. The method according to claim 3, wherein:
   said filtering step performs switching between first to third filtering processes for execution in accordance with situations of said correlation of each pixel within a predetermined region surrounding the target pixel, said first filtering process being executed upon said target pixel by counting the frequency of occurrence of said correlation of each pixel within the predetermined region surrounding said target pixel, said second filtering process being executed upon said target pixel by counting the frequency of occurrence of said correlation of each pixel within the predetermined region surrounding said target pixel after weighting in accordance with a positional relationship between each pixel and said target pixel, said third filtering process being executed upon said target pixel by counting the frequency of occurrence of said correlation of each pixel within the predetermined region surrounding said target pixel only when a direction connecting said target pixel and each pixel conforms with said correlation.

8. An image processing apparatus comprising:

an image processing part; and an imaging device including a plurality of pixels and for outputting pixel signals for the respective pixels to said image processing part, each of said pixel signals including a signal for at least one of a plurality of color components in a predetermined color space, said image processing part including a correlation judgment part for judging a correlation of each of said pixels corresponding to said pixel signals by using pixel signals within a predetermined region surrounding each pixel, for determining a vertical correlation, a horizontal correlation, and a diagonal correlation, an interpolation processing part for executing a pixel interpolation process upon each of said pixels corresponding to said pixel signals, the pixel interpolation process performing interpolation of the pixels in a direction that corresponds to a correlation direction determined by the correlation judgment part, and a filtering processing part for executing a filtering process upon each of said pixels corresponding to said pixel signal outputted from said interpolation processing part, for filtering each of the pixels in a vertical direction, a horizontal direction, and a diagonal direction, respectively, to filter each of the pixels in a vertical direction, a horizontal direction, and a diagonal direction, respectively, by counting which interpolation direction the predetermined region was subjected to most frequently by said pixel interpolation processing part, and by using said most frequent interpolation direction as the filtering direction.

9. The image processing apparatus according to claim 8, wherein said filter selection part changes filter factors for said filters in real time based on said correlation to thereby select said one filter.

10. An image processing apparatus comprising:

a correlation judgment part for judging a correlation of each of a plurality of pixels corresponding to respective pixel signals in a predetermined color space by using pixel signals within a predetermined region surrounding each pixel and for determining a correlation of each pixel with the surrounding region in a vertical direction, a horizontal direction, a diagonally rightward direction, and a diagonally leftward direction; and a filtering processing part for executing a filtering process upon each of said pixels corresponding to said pixel signal, for filtering a target pixel within the predetermined region in a vertical direction, a horizontal direction, and a diagonally rightward direction, and a diagonally leftward direction, respectively, by counting which correlation direction was found most frequently in the predetermined region by said correlation judgment part, and by using said most frequent correlation direction as the filtering direction.

11. The image processing apparatus according to claim 10, wherein said filtering processing part executes the filtering process upon said target pixel, when a number of occurrence of the correlation direction that occurs the most frequently exceeds a predetermined threshold value.

12. The image processing apparatus according to claim 10, wherein said filtering processing part executes the filtering process upon the target pixel by counting the frequency of occurrence of said correlation of each pixel within the predetermined region surrounding said target pixel after weighting in accordance with a positional relationship between each pixel and said target pixel.

13. The image processing apparatus according to claim 10, wherein said filtering processing part executes the filtering process upon the target pixel by counting the frequency of occurrence of said correlation of each pixel within the predetermined region surrounding said target pixel only when a direction connecting said target pixel and each pixel conforms with said correlation.

14. The image processing apparatus according to claim 10, wherein said filtering processing part performs switching between first to third filtering processes for execution in accordance with situations of said correlation of each pixel within a predetermined region surrounding the target pixel, said first filtering process being executed upon said target pixel by counting the frequency of occurrence of said correlation of each pixel within the predetermined region surrounding said target pixel, said second filtering process being executed upon said target pixel by counting the frequency of occurrence of said correlation of each pixel within the predetermined region surrounding said target pixel after weighting in accordance with a positional relationship between each pixel and said target pixel, said third filtering process being executed upon said target pixel by counting the frequency of occurrence of said correlation of each pixel within the predetermined region surrounding said target pixel only when a direction connecting said target pixel and each pixel conforms with said correlation.

* * * * *